United States Patent
Yonezawa et al.

(10) Patent No.: US 9,709,726 B2
(45) Date of Patent: Jul. 18, 2017

(54) DISPLAY APPARATUS AND METHOD OF MANUFACTURING THE DISPLAY APPARATUS

(71) Applicant: Sakai Display Products Corporation, Sakai-shi, Osaka (JP)

(72) Inventors: Nobuhiro Yonezawa, Sakai (JP); Daishi Ishikawa, Sakai (JP); Tomonori Takobe, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 144 days.

(21) Appl. No.: 14/423,979

(22) PCT Filed: Sep. 26, 2014

(86) PCT No.: PCT/JP2014/075697
§ 371 (c)(1),
(2) Date: Feb. 25, 2015

(87) PCT Pub. No.: WO2016/046974
PCT Pub. Date: Mar. 31, 2016

(65) Prior Publication Data
US 2016/0259121 A1      Sep. 8, 2016

(51) Int. Cl.
*F21V 8/00* (2006.01)
*G02F 1/1333* (2006.01)

(52) U.S. Cl.
CPC .......... *G02B 6/0088* (2013.01); *G02B 6/005* (2013.01); *G02B 6/0065* (2013.01); *G02F 1/1333* (2013.01); *G02F 2001/133317* (2013.01)

(58) Field of Classification Search
CPC .... G02B 6/0088; G02B 6/005; G02B 6/0065; G02F 1/1333; G02F 2001/133317
See application file for complete search history.

(56) References Cited

U.S. PATENT DOCUMENTS

2009/0303409 A1* 12/2009 Park .................. G02F 1/133308
349/58
2014/0204310 A1   7/2014 Lee et al.

FOREIGN PATENT DOCUMENTS

| JP | 2007-232809 | 9/2007 |
| JP | 2014-026293 | 2/2014 |
| JP | 2014-142614 | 8/2014 |

* cited by examiner

*Primary Examiner* — Stephen F Husar
(74) *Attorney, Agent, or Firm* — Rudy J. Ng; Bret E. Field; Bozicevic, Field & Francis LLP

(57) ABSTRACT

An example display apparatus, comprising a display panel with one surface on which an image is displayed, a light guide plate disposed to face the other surface of the display panel, an optical sheet interposed between the display panel and the light guide plate, and a spacer which is sandwiched between the display panel and the light guide plate to secure a space for the optical sheet, wherein the spacer is adhered to the light guide plate and the display panel.

13 Claims, 4 Drawing Sheets

DISPLAY APPARATUS AND METHOD OF MANUFACTURING THE DISPLAY APPARATUS

CROSS-REFERENCE TO RELATED APPLICATIONS

This application is the national phase under 35 U.S.C. §371 of PCT International Application No. PCT/JP2014/075697 which has International filing date of Sep. 26, 2014 and designated the United States of America.

FIELD

The technology herein relates to a display apparatus and a method of manufacturing the display apparatus.

BACKGROUND AND SUMMARY

A display apparatus including a liquid crystal panel as an image display unit is configured in such a manner that a backlight is disposed on a rear surface side of the liquid crystal panel, and light emitted from the backlight is modulated and transmitted by the liquid crystal panel so as to display an image on a front surface of the liquid crystal panel. The backlight is broadly divided into a direct type and an edge light type. In recent years, to reduce power consumption and thin a frame, the edge light type backlight is widely employed.

The edge light type backlight includes a light guide plate and a light source which are housed in a backlight chassis formed in a shallow bottom box shape. The light guide plate is a flat plate made of translucent glass or a resin material, and is placed on a bottom plate of the backlight chassis. The light source is attached to one side wall of the backlight chassis to face one side surface of the light guide plate. Light emitted from the light source is incident on one side surface of the light guide plate and travels in the light guide plate, and then the light is distributed throughout the entire one wide surface of the light guide plate which is exposed to an opening side of the backlight chassis, and emitted therefrom.

The display apparatus has a configuration in which the one wide surface of the light guide plate is arranged to face the rear surface of the liquid crystal panel, and an optical sheet is interposed between the surfaces facing each other. The optical sheet is an optical element which functions to diffuse and condense light. The light emitted from the light guide plate is directed to the liquid crystal panel via the optical sheet.

For example, in a display apparatus, a light guide plate and a liquid crystal panel are arranged to face each other at an appropriate interval by a frame-shaped spacer which are provided in respective peripheral edge parts, and an optical sheet is disposed in an inner space defined by the spacer.

In addition, by applying a thermosetting or UV curable adhesive so as to surround outer periphery of the spacer, the light guide plate and the liquid crystal panel are coupled with each other.

A method of manufacturing a display apparatus includes the processes of: disposing an optical sheet on one wide surface of a light guide plate; temporarily fixing a spacer on the light guide plate by using a double-sided adhesive sheet so as to surround the optical sheet; thereafter applying an adhesive on an outer periphery of the spacer and placing a display panel on the spacer; and performing heating or UV irradiation to the adhesive to cure the adhesive, so as to couple the light guide plate and the liquid crystal panel with each other.

However, as in the display apparatus described, when the spacer is temporarily fixed by using the double-sided adhesive sheet, and the adhesive is used for adhering the light guide plate and the liquid crystal panel, a large amount of labor and time to manufacture the display apparatus is required, and the number of component members of the display apparatus are increased, thereby causing an increase in costs. In addition, when temporarily fixing the spacer on the light guide plate by using the double-sided adhesive sheet, a position shift between the spacer and the optical sheet may easily occur as the size of the display apparatus becomes larger. Further, there is a problem such as an increase in the incidence of malfunction of the display apparatus by the position shift.

In consideration of the above-described circumstances, it is an object to provide an example embodiment of a display apparatus capable of accurately positioning a spacer and an optical sheet, and a method of manufacturing the display apparatus.

According to one aspect of the example embodiment, there is provided a display apparatus comprising a display panel with one surface on which an image is displayed, a light guide plate disposed to face the other surface of the display panel, an optical sheet interposed between the display panel and the light guide plate, and a spacer which is sandwiched between the display panel and the light guide plate to secure a space for the optical sheet, wherein the spacer is adhered to the light guide plate and the display panel.

According to the example embodiment, since the spacer is fixed to the display panel and the light guide plate, a member used for coupling the light guide plate and the display panel is unnecessary, aside from the spacer. Thereby, the labor and time in manufacturing of the display apparatus may be reduced, as well as the number of the components of the display apparatus, and the manufacturing costs thereof may also be reduced.

In the display apparatus according to the example embodiment, the optical sheet has a peripheral edge provided with a convex part, and the spacer is provided so as to surround the optical sheet and has a void in which the convex part is inserted.

According to the example embodiment, by inserting the convex part of the optical sheet into the void of the spacer, the optical sheet is positioned on the light guide plate.

In the display apparatus according to the example embodiment, the spacer includes a plurality of layers laminated in a direction in which the display panel and the light guide plate face each other.

According to the example embodiment, since the spacer includes the plurality of layers, the display panel and the light guide plate may be stably coupled with each other. In addition, it is easy to take a wide space between the display panel and the light guide plate.

According to another aspect of the example embodiment, a method of manufacturing the above-described display apparatus, comprises the processes of: dropping solidifiable liquid on the light guide plate; placing the display panel on the dropped liquid; and solidifying the liquid after placing the display panel, wherein the spacer is formed by solidification of the liquid.

According to the example embodiment, since the spacer is formed by the dropping of the liquid, it is possible to mechanically form the spacer by the scanning with an automatic dropping device. Thereby, it is possible to accurately position the spacer.

In addition, by the liquid is solidified after placing the liquid crystal panel on the light guide plate, the light guide plate and the display panel are coupled with each other. Since the liquid is solidified between the display panel and the light guide plate, it serves as the spacer. Thereby, the labor and time in manufacturing of the display apparatus may be reduced, as well as the number of the components of the display apparatus, and the manufacturing costs thereof may be reduced.

According to another aspect of the example embodiment, a method of manufacturing the above-described display apparatus, comprises the processes of: dropping a molten hot-melt adhesive on the light guide plate; and placing the display panel on the dropped adhesive before the adhesive is solidified; wherein the spacer is formed by solidification of the adhesive.

According to the example embodiment, since the spacer is formed by the dropping of the molten hot-melt adhesive, it is possible to mechanically form the spacer by the scanning with the automatic dropping device. Thereby, it is possible to accurately position the spacer.

In addition, by the adhesive is solidified after placing the display panel on the light guide plate, the light guide plate and the display panel are coupled with each other. In addition, since the adhesive is solidified between the display panel and the light guide plate, it serves as the spacer. Thereby, the labor and time in manufacturing of the display apparatus may be reduced, as well as the number of the components of the display apparatus, and the manufacturing costs thereof may be reduced.

Further, after the display panel is placed and before the adhesive is solidified at room temperature, and thereby the display panel and the light guide plate are coupled with each other. Therefore, in particular, it is possible to couple the display panel and the light guide plate with each other without performing the solidifying process of the adhesive.

According to another aspect of the example embodiment, a method of manufacturing the display apparatus according to claim 11, comprising the processes of: dropping solidifiable liquid on the light guide plate; stacking the optical sheet on the light guide plate; placing the display panel on the dropped liquid; and solidifying the liquid after placing the display panel, wherein the spacer is formed by solidification of the liquid.

According to the example embodiment, the optical sheet may be disposed on the light guide plate, and then may be interposed between the display panel and the light guide plate. Since the optical sheet is stacked after dropping the liquid, it is possible to accurately position the optical sheet.

According to another aspect of the example embodiment, a method of manufacturing the above-described display apparatus, comprise the processes of: forming the spacer by dropping solidifiable liquid on the light guide plate and solidifying the liquid; and stacking the optical sheet on the light guide plate after the forming process.

According to the example embodiment, since the spacer is formed by solidification of the liquid, and then the optical sheet is stacked on the light guide plate, it is possible to prevent the optical sheet from coming into contact with the unsolidified liquid and being unintentionally adhered thereto.

According to another aspect of the example embodiment, a method of manufacturing the above-described display apparatus, comprises: a dropping process that drops solidifiable liquid on the light guide plate; a solidifying process that solidifies the liquid; and a stacking process that stacks the optical sheet on the light guide, wherein the plurality of layers are formed by a repeat of the dropping process and the solidifying process, and the stacking process is performed after forming a part of the plurality of layers during the repeat of the dropping process and the solidifying process.

According to the example embodiment, since a part of the plurality of layers in the spacer are formed, and then the optical sheet is stacked on the light guide plate, it is possible to prevent the optical sheet from coming into contact with the unsolidified liquid and being unintentionally adhered thereto.

According to another aspect of the example embodiment, a method of manufacturing the above-described display apparatus, comprises: a dropping process that drops solidifiable liquid on the light guide plate; a solidifying process that solidifies the liquid; a stacking process that stacks the optical sheet on the light guide; and a placing process that places the display panel on the dropped liquid, wherein the plurality of layers are formed by a repeat of the dropping process and the solidifying process, the stacking process is performed after forming a part of the plurality of layers during the repeat of the dropping process and the solidifying process, and the placing process is performed between the stacking process and solidification of the lastly dropped liquid during the repeat of the dropping process and the solidifying process.

According to the example embodiment, by solidification of the lastly dropped liquid, the display panel and the light guide plate are coupled with each other.

According to another aspect of the example embodiment, A method of manufacturing a display apparatus comprising a display panel with one surface on which an image is displayed, a light guide plate disposed to face the other surface of the display panel, an optical sheet interposed between the display panel and the light guide plate, and a spacer which is sandwiched between the display panel and the light guide plate to secure a space for the optical sheet, the method comprising: forming the spacer by dropping solidifiable liquid on the light guide plate and solidifying the liquid.

According to the example embodiment, since the spacer is formed by the dropping of the liquid, it is possible to mechanically form the spacer by the scanning with the automatic dropping device. Thereby, it is possible to accurately position the spacer.

According to the example embodiment, it is possible to accurately position the spacer and the optical sheet in the display apparatus.

DETAILED DESCRIPTION OF NON-LIMITING EXAMPLE EMBODIMENTS

Figure 1:
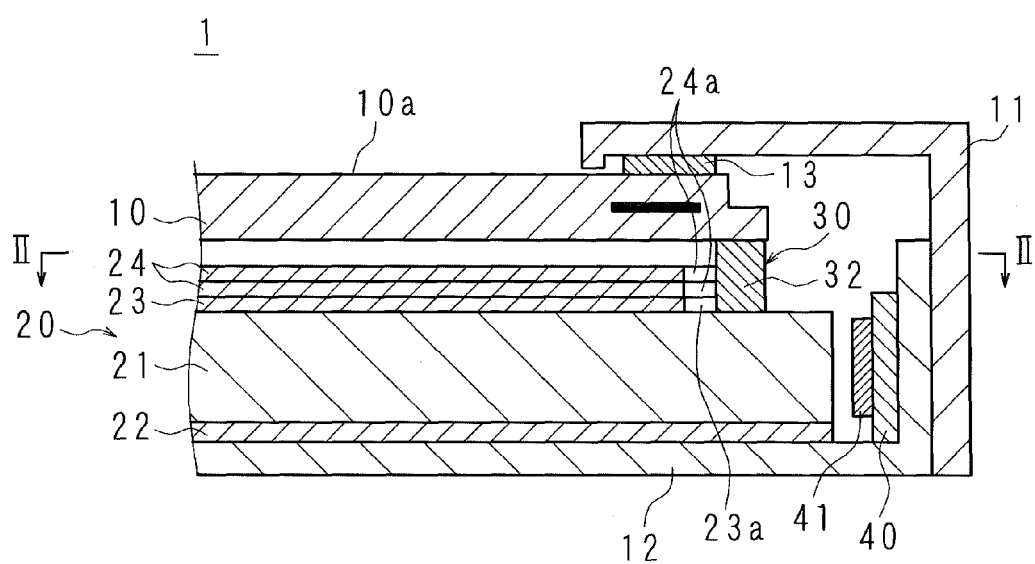
FIG. 1 is a cross-sectional view illustrating main components of an example of non-limiting display apparatus.

Hereinafter, a display apparatus according to an embodiment will be described with reference to the accompanying drawings. FIG. 1 is a cross-sectional view illustrating main components of an example of non-limiting display apparatus 1. The display apparatus 1 includes a liquid crystal panel 10, a bezel 11, a backlight chassis 12, and a backlight 20 housed in the backlight chassis 12.

The bezel 11 has a rectangular frame, and side plates which vertically stand from four sides forming the outer periphery of the frame. The backlight chassis 12 has a rectangular bottom plate, and side plates which vertically stand from four sides forming the outer periphery of the bottom plate, and is formed in a shallow bottom box shape whose one surface is open. In addition, the liquid crystal panel 10 is formed in a rectangular shape, and has a display surface 10a formed as a front surface thereof to display an image.

The backlight 20 includes a rectangular light guide plate 21, and light sources 41, 41 . . . , arranged to face one side surface of the light guide plate 21. The light guide plate 21 is a flat plate made of a translucent glass or resin material, and has one wide surface and the other wide surface provided with a dot pattern for scattering light.

The light guide plate 21 is placed on the bottom plate of the backlight chassis 12 through a reflection sheet 22. The other wide surface of the light guide plate 21 in the contact with the reflection sheet 22. In addition, the light sources 41, 41 . . . are arranged in parallel with a substrate 40 mounted on a side wall of the backlight chassis 12 corresponding to the one side surface of the light guide plate 21.

The one wide surface of the light guide plate 21 is provided with a spacer 30 having a configuration to be described below. The light guide plate 21 is coupled to the liquid crystal panel 10 through the spacer 30. The spacer 30 is adhered to an edge part of a rear surface of the liquid crystal panel 10 and an edge part of the one wide surface of the light guide plate 21.

In addition, a diffusion sheet 23 and two prism sheets 24 and 24 are interposed on the one wide surface of the light guide plate 21 in an inner space defined by the spacer 30. The liquid crystal panel 10 and the light guide plate 21 are separated from each other by a prescribed distance by the spacer 30, and thereby the space in which the diffusion sheet 23 and the prism sheets 24 and 24 are interposed is secured.

In the above-described configuration, a member used for coupling the liquid crystal panel 10 and the light guide plate 21 is unnecessary, aside from the spacer 30. Thereby, it is possible to reduce the labor and time in manufacturing of the display apparatus 1, and decrease the number of the components of the display apparatus 1 and the manufacturing costs thereof.

The bezel 11 is covered so that each of the side plates thereof in the contact with the backlight chassis 12. The liquid crystal panel 10 is disposed in such a manner that a peripheral edge part of the display surface 10a is covered by the frame of the bezel 11 through a buffer material 13.

Figure 2:
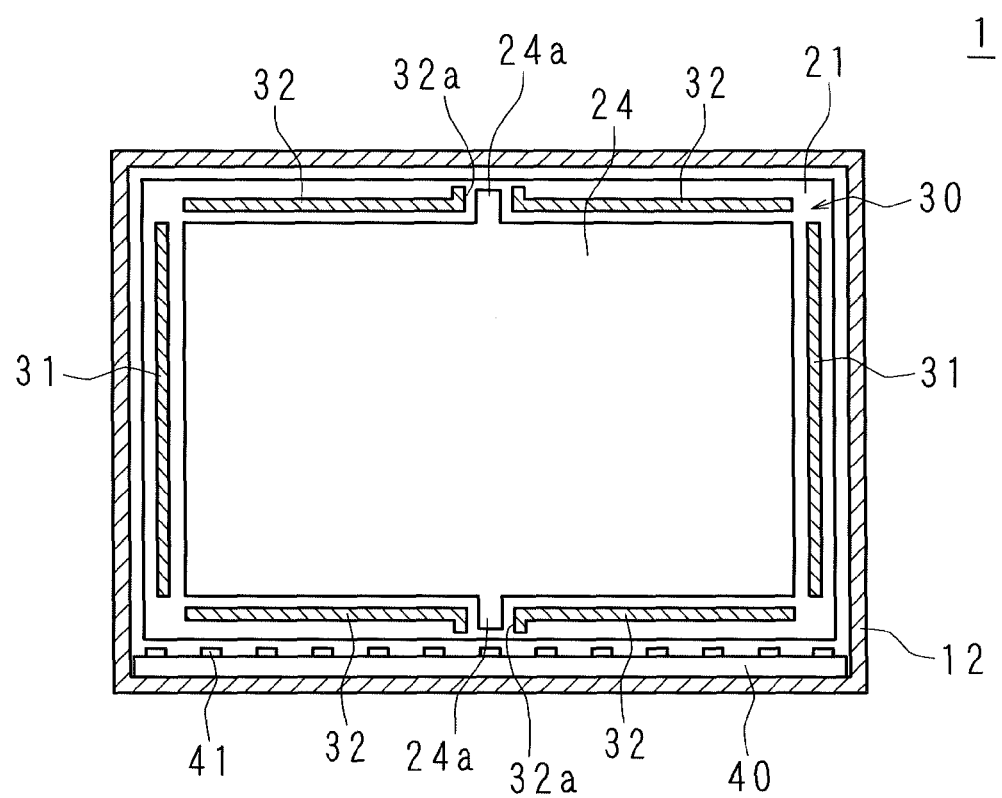
FIG. 2 is a cross-sectional view taken on line II-II of FIG. 1.

FIG. 2 is a cross-sectional view taken on line II-II of FIG. 1. The diffusion sheet 23 and the prism sheet 24 are formed in a rectangular shape, and have a convex part 23a and a convex part 24a formed at the respective peripheral edges thereof by protruding from the respective central parts of two long sides so as to form the same plane.

The diffusion sheet 23 and the prism sheets 24 and 24 are stacked and placed on the one wide surface of the light guide plate 21. The diffusion sheet 23 and the prism sheets 24 and 24 are stacked so that the convex part 23a and the convex part 24a correspond to each other.

The spacer 30 is formed on the one wide surface of the light guide plate 21 along four sides of the diffusion sheet 23 and the prism sheet 24 so as to surround the same. Therefore, the liquid crystal panel 10 and the light guide plate 21 may be stably coupled with each other.

As illustrated in FIG. 2, the spacer 30 has two short side spacers 31 and 31 formed in a linear shape parallel to the short sides of the diffusion sheet 23 and the prism sheet 24. In addition, the spacer 30 has two long side spacers 32 and 32 formed in a linear shape parallel to the long sides of the diffusion sheet 23 and the prism sheet 24.

The long side spacer 32 is separated at a center in a longitudinal direction thereof. In the separated portions, end portions facing each other are bent in an outside direction of the light guide plate 21. The long side spacer 32 has a void 32a formed by the end portions facing each other.

As illustrated in FIGS. 1 and 2, the diffusion sheet 23 and the prism sheet 24 are disposed on the one wide surface of the light guide plate 21 in the inner space of the spacer 30, and the convex part 23a of the diffusion sheet 23 and the convex part 24a of the prism sheet 24 are inserted into the void 32a. Thereby, it is possible to position the diffusion sheet 23 and the prism sheet 24 in the light guide plate 21.

Light emitted from the light source 41 enters from one side surface of the light guide plate 21, travels in the light guide plate 21, and then is distributed throughout the entire one wide surface thereof and emitted there from. The light emitted from the light guide plate 21 is modulated and transmitted by the liquid crystal panel 10 so as to display an image on the display surface 10a.

In order to reduce unevenness in brightness of the light emitted from the one wide surface of the light guide plate 21, the diffusion sheet 23 diffuses the incident light. The prism sheet 24 enhances concentrating properties of the light emitted from the diffusion sheet 23 in a direction of the liquid crystal panel 10.

Figure 3A:
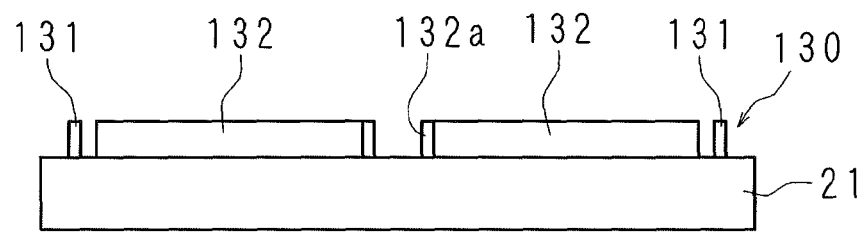
FIG. 3A is a view illustrating a manufacturing process of the display apparatus.
Figure 3B:
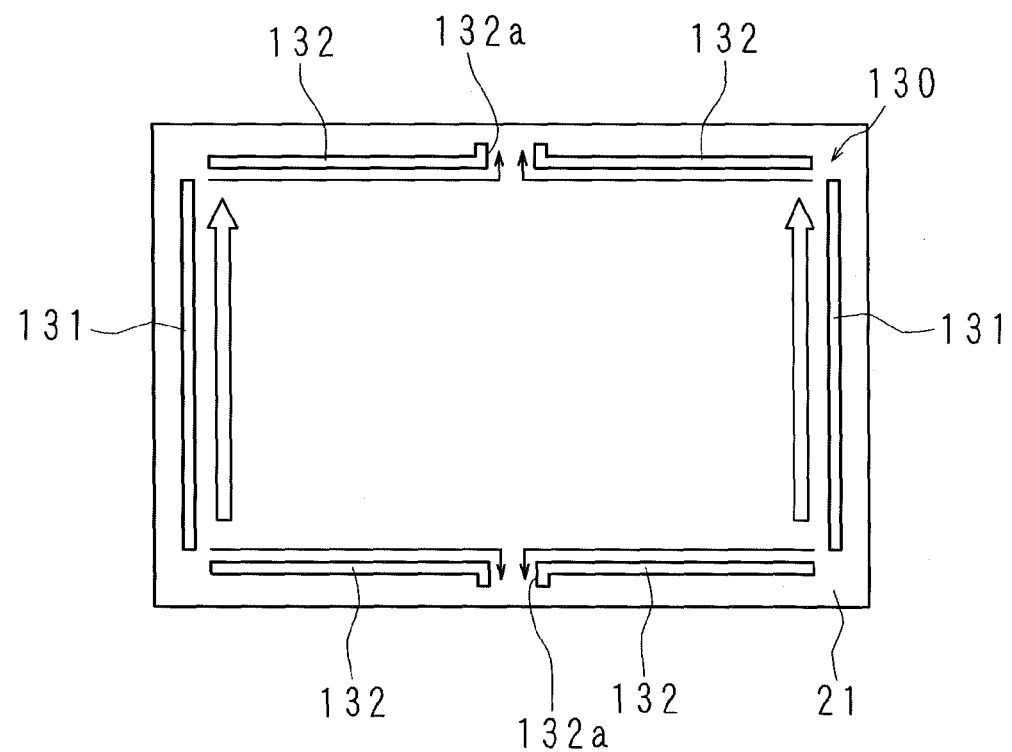
FIG. 3B is a view illustrating the manufacturing process of the display apparatus.
Figure 4A:
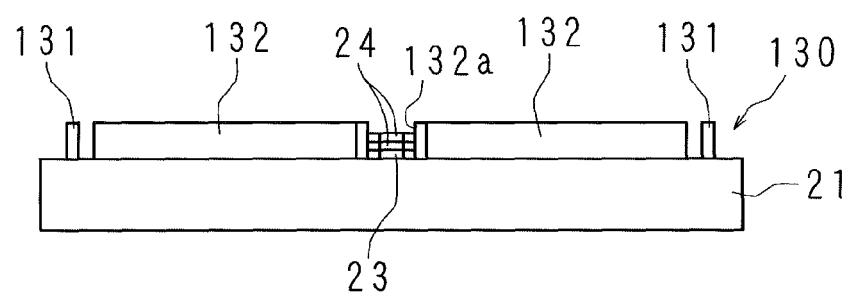
FIG. 4A is a view illustrating the manufacturing process of the display apparatus.
Figure 4B:
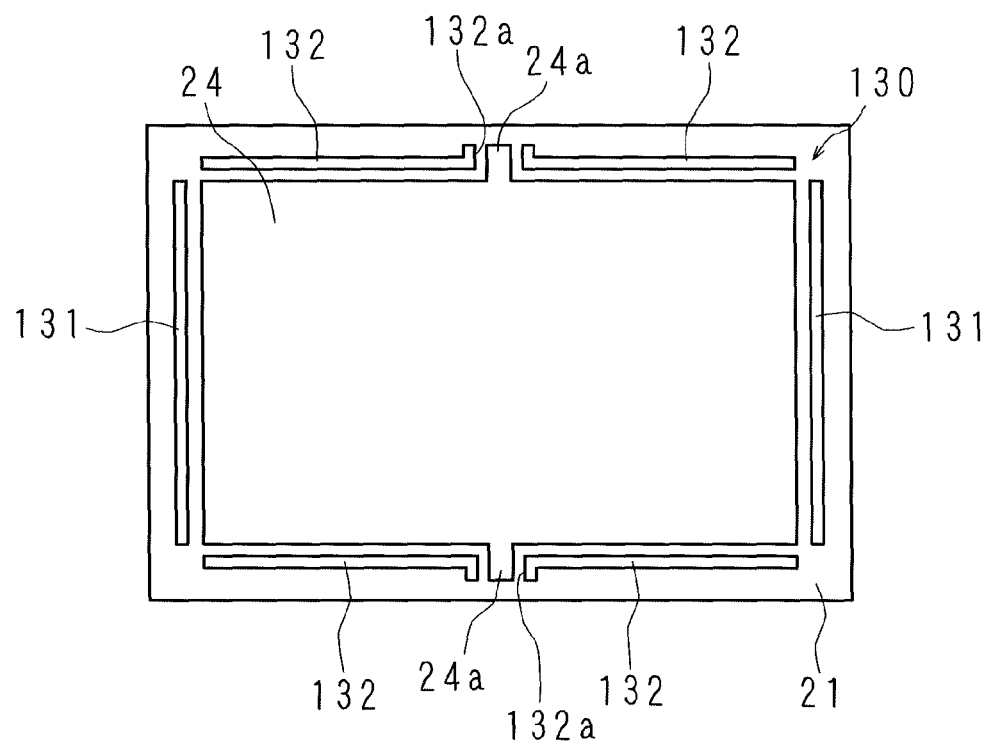
FIG. 4B is a view illustrating the manufacturing process of the display apparatus.

Next, a method of manufacturing the display apparatus 1 will be described. FIGS. 3A, 3B, 4A and 4B are views illustrating a manufacturing process of the display apparatus. FIGS. 3A and 3B are side views, and FIGS. 4A and 4B are plan views. First, as illustrated in FIG. 3A, a molten hot-melt adhesive 130 is dropped on the light guide plate 21 so as to be formed in a prescribed height.

Dropping of the adhesive 130 with respect to two short sides of the light guide plate 21 is performed by scanning with a dropping device in a direction illustrated by an outline arrow in FIG. 3B along the respective short sides, such that the adhesive 130 is continuously dropped. Thereby, short side adhesive layers 131 are formed, and by solidification of the short side adhesive layers 131, the short side spacers 31 are formed.

With respect to two long sides of the light guide plate 21, by scanning with the dropping device along the long sides from both ends of the long sides toward the central part as illustrated by a solid line arrow in FIG. 3B, the adhesive 130 is continuously dropped. Thereby, long side adhesive layers 132 are formed, and by solidification of the long side adhesive layers 132, the long side spacers 32 are formed.

The dropping device, for example, linearly performs scanning by reading the dot pattern formed on the light guide plate 21, and automatically determining a starting point and an end point by the processing of a CPU. In addition, the dropping device moving along the long sides scans to the central part of the long side, and then changes the traveling direction thereof is changed to the outside direction of the light guide plate 21, and stops after slightly scanning. Thereby, voids 132a are formed at the central part of the long sides, and by solidification of the long side adhesive layers 132, the voids 32a are formed at portions corresponding to the voids 132a.

The adhesive 130 is dropped along with the dropping device, and thereby, as illustrated in FIGS. 3A and 3B, the spacer 30 may be accurately formed on a prescribed position without a position shift. Thereby, when the optical sheet is disposed, positioning of the optical sheet may be accurately performed.

After the adhesive 130 is dropped and before it is solidified, the diffusion sheet 23 and the prism sheet 24 are disposed on the one wide surface of the light guide plate 21. The diffusion sheet 23 and the prism sheet 24 are stacked on the one wide surface of the light guide plate 21, as illustrated in FIGS. 4A and 4B.

In the stack of the diffusion sheet 23 and the prism sheet 24 as illustrated in FIG. 4B, the convex part 23a and the convex part 24a are inserted into the voids 132a. Thereby, the diffusion sheet 23 and the prism sheet 24 may be accurately positioned.

After stacking the diffusion sheet 23 and the prism sheet 24, the liquid crystal panel 10 is placed on the short side adhesive layers 131 and the long side adhesive layers 132. When the dropped adhesive 130 is solidified, the spacer 30 is formed, so that the liquid crystal panel 10 and the light guide plate 21 are coupled with each other.

Then, the coupled liquid crystal panel 10 and light guide plate 21, and the light sources 41 are transferred into the backlight chassis 12, and the bezel 11 is covered and fixed thereto to prepare the display apparatus 1.

Conventionally, when the spacer made of a flexible material is placed on the light guide plate by a worker, it becomes difficult for the worker to position the spacer, and thereby positioning thereof is difficult. However, in the present embodiment, since the spacer 30 is formed by dropping the adhesive 130 by scanning with the dropping device, the spacer 30 may be automatically formed, and thereby the spacer 30 may be accurately disposed at the prescribed position, and the diffusion sheet 23 and the prism sheet 24 may also be accurately disposed. Therefore, the manufacturing costs of the display apparatus 1 may be reduced.

By the adhesive 130 being solidified after crystal panel 10 is placed, the liquid crystal panel 10 and the light guide plate 21 are coupled with each other. In addition, since the adhesive 130 is solidified between the liquid crystal panel 10 and the light guide plate 21, the adhesive also serves as the spacer 30. Therefore, the number of components in manufacturing of the display apparatus 1 may be reduced and costs thereof may be decreased.

After the liquid crystal panel 10 is placed and before the adhesive 130 is solidified, the adhesive is solidified at room temperature, and thereby the liquid crystal panel 10 and the light guide plate 21 are coupled with each other. Therefore, it is possible to couple the liquid crystal panel 10 and the light guide plate 21 with each other without particularly performing the solidifying process of the adhesive 130.

Meanwhile, in dropping of the adhesive 130 by the dropping device, it may be configured to flatten the surface of the dropped adhesive 130 by using a squeegee. Further, there is no need to continuously form the spacer 30, and for example, the spacer may be configured to be formed in a dot shape along the four sides of the diffusion sheet 23 and the prism sheet 24.

Further, the spacer 30 is formed in a single layer, but it may be configured in such a manner that the spacer is formed in a plurality of layers laminated in a direction in which the liquid crystal panel 10 and the light guide plate 21 face each other. In addition, not limited to the hot-melt adhesive 130, it may be configured to form the spacer 30 including a single layer or a plurality of layers by using a UV curable resin.

When forming the spacer including the plurality of layers by using the UV curable resin, first, a liquid UV curable resin is dropped on the light guide plate 21 by the dropping device. Next, a UV beam is directed onto the UV curable resin dropped on the light guide plate 21 to solidify. Thereby, a layer of a part of the spacer 30 is formed.

Thereafter, the diffusion sheet 23 and the prism sheet 24 are stacked on the one wide surface of the light guide plate 21 in an inner space of the layer of a part of the spacer 30. Further, the UV curable resin is dropped on the layer of a part of the spacer 30 by the dropping device, and the liquid crystal panel 10 is placed thereon. After placing the liquid crystal panel 10, the UV beam is directed onto the UV curable resin to solidify.

In this case, since the layer of a part of the spacer 30 is solidified before the diffusion sheet 23 and the prism sheet 24 are stacked, it is possible to prevent, due to tackiness of the surface being lost, the diffusion sheet 23 and the prism sheet 24 from coming into contact with the UV curable resin by the position shift during manufacturing the display apparatus 1, and being unintentionally adhered thereto.

Meanwhile, after forming the spacer 30 including the single layer by the UV curable resin, the diffusion sheet 23 and the prism sheet 24 may be stacked on the light guide plate 21, and the liquid crystal panel 10 may be placed on the spacer 30 and adhered to the light guide plate 21 by means other than the spacer 30. In this case, it is also possible to prevent the diffusion sheet 23 and the prism sheet 24 from coming into contact with the UV curable resin by the position shift during manufacturing the display apparatus 1, and being unintentionally fixed thereto.

In addition, it may be configured in such a manner that the liquid crystal panel 10 and the light guide plate 21 are coupled with each other by an adhesive made of a thermosetting resin, or by an epoxy resin adhesive using a curing agent, such that the spacer 30 is formed.

It should be understood that the embodiments disclosed herein are illustrative and non-restrictive in every respect. Since the scope of the example embodiment is defined by the appended claims rather than by the description preceding them, and all changes that fall within metes and bounds of the claims, or equivalence of such metes and bounds thereof are therefore intended to be embraced by the claims. That is, embodiments obtained by combining technical means appropriately modified within the scope defined by the appended claims are also included in the technical scope of the example embodiment.

The invention claimed is:

1. A display apparatus, comprising a display panel with one surface on which an image is displayed, a light guide plate disposed to face the other surface of the display panel, an optical sheet interposed between the display panel and the light guide plate, and a spacer which is sandwiched between the display panel and the light guide plate to secure a space for the optical sheet, wherein the spacer is adhered to the light guide plate and the display panel, the optical sheet has a peripheral edge provided with a convex part, and the spacer is provided so as to surround the optical sheet and has a void in which the convex part is inserted.

2. A method of manufacturing the display apparatus according to claim 1, comprising the processes of:
dropping solidifiable liquid on the light guide plate;
placing the display panel on the dropped liquid; and
solidifying the liquid after placing the display panel,
wherein the spacer is formed by solidification of the liquid.

3. A method of manufacturing the display apparatus according to claim 1, comprising the processes of:
dropping a molten hot-melt adhesive on the light guide plate; and
placing the display panel on the dropped adhesive before the adhesive is solidified;
wherein the spacer is formed by solidification of the adhesive.

4. A method of manufacturing the display apparatus according to claim 1, comprising the processes of:
dropping solidifiable liquid on the light guide plate;
stacking the optical sheet on the light guide plate;
placing the display panel on the dropped liquid; and
solidifying the liquid after placing the display panel,
wherein the spacer is formed by solidification of the liquid.

5. A method of manufacturing the display apparatus according to claim 1, comprising the processes of:
forming the spacer by dropping solidifiable liquid on the light guide plate and solidifying the liquid; and
stacking the optical sheet on the light guide plate after the forming process.

6. A display apparatus, comprising a display panel with one surface on which an image is displayed, a light guide plate disposed to face the other surface of the display panel, an optical sheet interposed between the display panel and the light guide plate, and a spacer which is sandwiched between the display panel and the light guide plate to secure a space for the optical sheet,
wherein
the spacer is adhered to the light guide plate and the display panel, and
the spacer includes a plurality of layers laminated in a direction in which the display panel and the light guide plate face each other.

7. A method of manufacturing the display apparatus according to claim 6, comprising:
a dropping process that drops solidifiable liquid on the light guide plate;
a solidifying process that solidifies the liquid; and
a stacking process that stacks the optical sheet on the light guide plate,
wherein the plurality of layers are formed by a repeat of the dropping process and the solidifying process, and the stacking process is performed after forming a part of the plurality of layers during the repeat of the dropping process and the solidifying process.

8. A method of manufacturing the display apparatus according to claim 6, comprising:
a dropping process that drops solidifiable liquid on the light guide plate;
a solidifying process that solidifies the liquid;
a stacking process that stacks the optical sheet on the light guide plate; and
a placing process that places the display panel on the dropped liquid,
wherein the plurality of layers are formed by a repeat of the dropping process and the solidifying process, the stacking process is performed after forming a part of the plurality of layers during the repeat of the dropping process and the solidifying process, and the placing process is performed between the stacking process and solidification of the lastly dropped liquid during the repeat of the dropping process and the solidifying process.

9. A method of manufacturing a display apparatus comprising a display panel with one surface on which an image is displayed, a light guide plate disposed to face the other surface of the display panel, an optical sheet interposed between the display panel and the light guide plate, and a spacer which is sandwiched between the display panel and the light guide plate to secure a space for the optical sheet, the method comprising:
forming the spacer by dropping solidifiable liquid on the light guide plate and solidifying the liquid.

10. The method of manufacturing the display apparatus according to claim 9, the method further comprising stacking the optical sheet on the light guide plate after forming the spacer.

11. A method of manufacturing a display apparatus comprising a display panel with one surface on which an image is displayed, a light guide plate disposed to face the other surface of the display panel, an optical sheet interposed between the display panel and the light guide plate, and a spacer which is sandwiched between the display panel and the light guide plate to secure a space for the optical sheet, the method comprising the processes of:
dropping solidifiable liquid on the light guide plate;
placing the display panel on the dropped liquid; and
solidifying the liquid after placing the display panel,
wherein the spacer is formed by solidification of the liquid.

12. The method of manufacturing the display apparatus according to claim 11, wherein
the dropping process comprises dropping a molten hot-melt adhesive on the light guide plate,
the placing process comprises placing the display panel on the dropped adhesive before the adhesive is solidified, and
the spacer is formed by solidification of the adhesive.

13. The method of manufacturing the display apparatus according to claim 11, further comprising the process of stacking the optical sheet on the light guide plate.

* * * * *